United States Patent
Fontanella et al.

(10) Patent No.: US 7,578,184 B2
(45) Date of Patent: Aug. 25, 2009

(54) PORTABLE APPARATUS WITH AN ACCELEROMETER DEVICE FOR FREE-FALL DETECTION

(75) Inventors: Luca Fontanella, Cusago (IT); Benedetto Vigna, Pietrapertosa (IT); Ernesto Lasalandra, S. Donato Milanese (IT); Caterina Riva, Cusago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 149 days.

(21) Appl. No.: 11/302,486

(22) Filed: Dec. 12, 2005

(65) Prior Publication Data
US 2006/0150731 A1 Jul. 13, 2006

(30) Foreign Application Priority Data
Dec. 23, 2004 (IT) .................... TO2004A0899

(51) Int. Cl.
*G01P 15/00* (2006.01)
(52) U.S. Cl. ..................................................... 73/488
(58) Field of Classification Search .................. 73/488, 73/499, 504.04, 498, 504.15, 504.17; 257/678, 257/104, 737, 738, 778, 777
See application file for complete search history.

(56) References Cited
U.S. PATENT DOCUMENTS

| | | | |
|---|---|---|---|
| 5,227,929 A * | 7/1993 | Comerford | 360/75 |
| RE35,269 E * | 6/1996 | Comerford | 360/75 |
| 6,046,877 A * | 4/2000 | Kelsic | 360/75 |
| 6,750,521 B1 * | 6/2004 | Chilcott et al. | 257/414 |
| 6,768,066 B2 * | 7/2004 | Wehrenberg | 200/61.49 |
| 6,891,239 B2 * | 5/2005 | Anderson et al. | 257/414 |
| 7,034,393 B2 * | 4/2006 | Alie et al. | 257/704 |

OTHER PUBLICATIONS

Roberto Oboe, "Use of MEMS based accelerometers in Hard Disk Drives," Jul. 8-12, 2001, IEEE International Conference on Advanced Intelligent Mechatronics Proceedings (1142-1147).*

* cited by examiner

*Primary Examiner*—Hezron Williams
*Assistant Examiner*—Gunnar J Gissel
(74) *Attorney, Agent, or Firm*—Lisa K. Jorgenson; E. Russel Tarleton; Seed IP Law Group PLLC

(57) ABSTRACT

A portable apparatus having an accelerometer device and a supporting element in the accelerometer device, having a first body of semiconductor material integrating a sensor element that detects movements of the first body and generates a signal correlated to the detected movement; a second body of semiconductor material that integrates a conditioning electronics and that is electrically connected to the first body; and conductive bumps that provide electrical connection of the first and second bodies to the supporting element. In particular, the conductive bumps connect the first and second bodies to the supporting element without the interposition of any packaging.

38 Claims, 2 Drawing Sheets

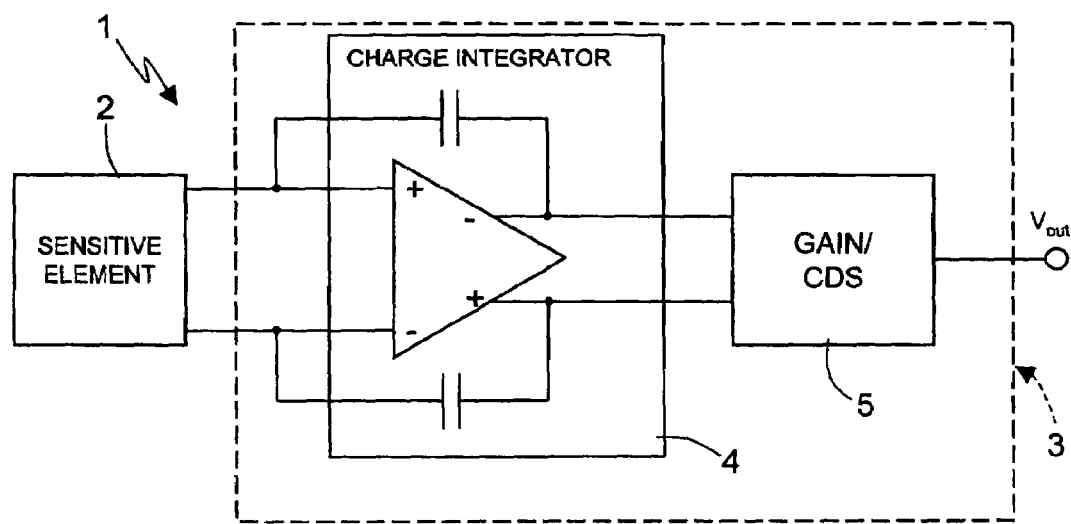
FIG. 1 *(Prior Art)*
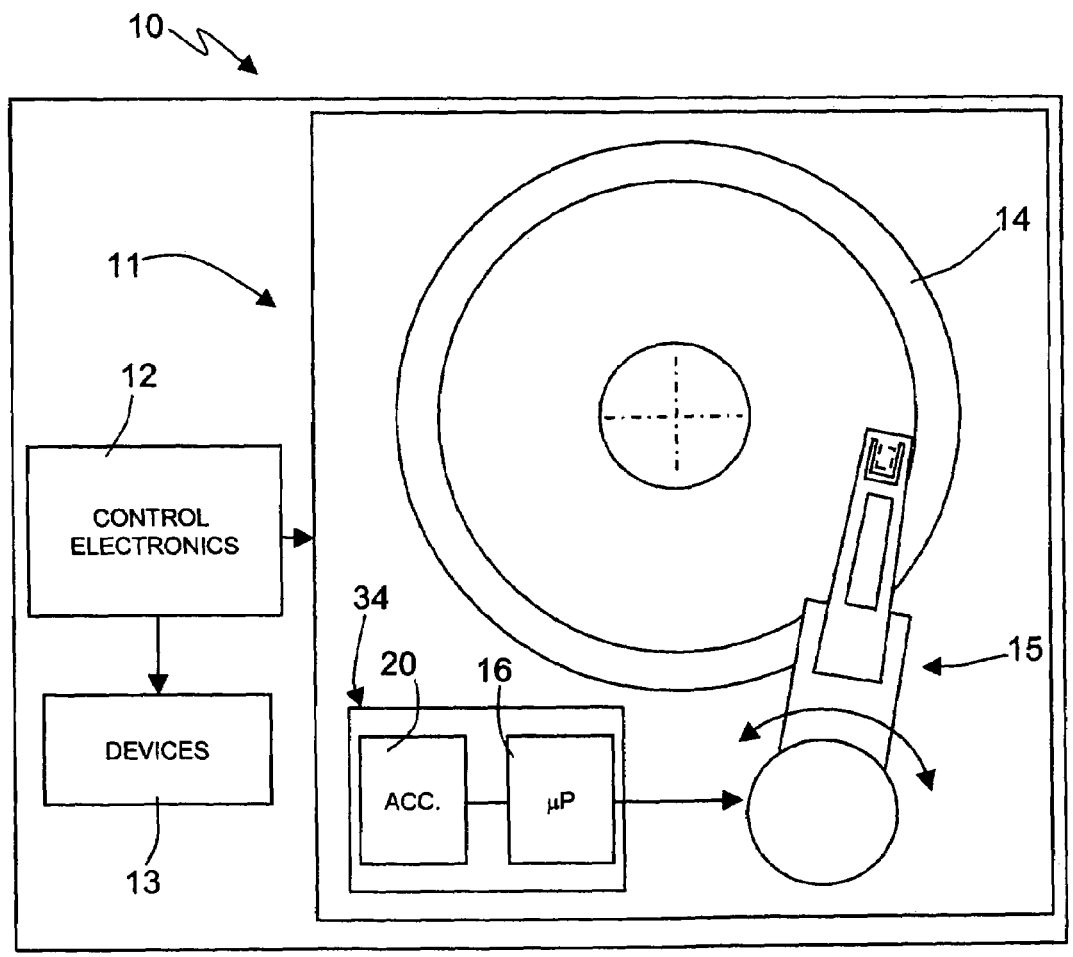
FIG. 2

PORTABLE APPARATUS WITH AN ACCELEROMETER DEVICE FOR FREE-FALL DETECTION

BACKGROUND OF THE INVENTION

1. Field of the Invention

The present invention relates to a portable apparatus with an accelerometer device for free-fall detection. In particular, the following description will make explicit reference to a portable apparatus provided with a mass storage device (hard disk), without this implying any loss of generality.

2. Description of the Related Art

As is known, portable electronic devices, such as for example laptops, PDAs (Personal Data Assistants), digital audio players, cell-phones, digital cameras and the like, can readily be subject to violent impact, in particular in the case where they are dropped on the ground during their normal use. In the event of fall, the impact of the portable apparatus on the ground has a particularly detrimental effect on a hard disk within the portable apparatus, in the worst case producing permanent damage and the consequent loss of the stored data.

Hard disks are very sensitive to impact in so far as the read/write head is normally kept at a very small distance from the data-storage medium. Consequently, in the event of impact, the read/write head strikes the data-storage medium and can be damaged together with it.

In order to prevent, or at least limit, the occurrence of said destructive events, it has been proposed to use linear accelerometers, fixed to the portable apparatus, to detect a free-fall condition of the portable apparatus. Following the free-fall detection, a command is issued for forced parking of the read/write head of the hard disk, which is brought into a safe area of the disk, for example to the position assumed by the head when the apparatus is turned off.

The free-fall condition is detected by appropriate processing of the acceleration signals generated by the accelerometer, and in particular by verifying that the acceleration detected along all the measurement axes is zero.

Linear accelerometer devices are known, built using semiconductor technology, namely the so-called MEMS (Micro-Electro-Mechanical-Systems). As is known, and illustrated in FIG. 1, a linear accelerometer device 1 of a MEMS type includes a sensitive element 2, which detects the acceleration and generates an electrical signal correlated to the detected acceleration, and a conditioning electronics 3 for the conditioning of the electrical signal, which includes a charge integrator 4 and a gain and noise-cancellation stage 5, in particular using the CDS (Correlated Double Sampling) technique.

It is also known that hard-disk manufacturers are reducing the dimensions of the hard disks, in particular in portable devices, wherein the miniaturization of dimensions is of fundamental importance. However, with current technologies, accelerometer devices have large physical dimensions (in particular as regards thickness), which make their integration within the hard disk an issue.

The sensitive element 2 is formed by two distinct portions of semiconductor material (generally silicon): a first portion, in which the microelectromechanical detection structure is formed, and a second portion, which has the function of a protective cap, and is applied to the first portion to seal it hermetically. The microelectromechanical structure must in fact be protected from dust and micrometric corpuscles which could alter its performance and jeopardize its correct operation. The conditioning electronics 3 is bonded on the-surface of the sensitive element 2 whereon contact metallizations are also formed, and electrical connection is obtained using the wire-bonding technique. The conditioning electronics 3 and the sensitive element 2 thus coupled together are coated with a molding resin and enclosed within a package. A structure of the type described cannot have a thickness of less than 1.5 to 2 mm, which prove excessive if compared with the currently required dimensions (a thickness of less than 1.5 mm is required).

The accelerometer devices are currently arranged within the portable apparatus in a position outside the hard disk and are generally coupled to the electronic circuit controlling the general operation of the portable apparatus. Such a solution, however, has problems due to the delays in communication of the free-fall detection signals from the accelerometer device to the hard disk. Consequently, the free-fall condition cannot be detected promptly enough to activate the appropriate actions of protection (for example, the parking of the read/write head) and hence prevent damage to the portable apparatus.

BRIEF SUMMARY OF THE INVENTION

The disclosed embodiments of the present invention provide a portable apparatus that will enable a solution to the aforementioned problems, and in particular will be provided with an accelerometer device having a reduced thickness such as to enable integration of the accelerometer device within the electronic device that it is desired to protect from impact, for example, within a hard disk.

In accordance with one embodiment of the invention, a portable apparatus having an accelerometer device and a supporting element is provided, the accelerometer device having a first body of semiconductor material integrating a sensor element configured to detect movements of said first body and generating a signal correlated to said movements; a second body of semiconductor material integrating conditioning electronics, said second body electrically connected to said first body; and electrical connection means for the electrical connection of said first and second bodies to said supporting element, said means of electrical connection connecting said first and second bodies to said supporting element without the interposition of packaging.

Ideally, the electrical connection means are in the form of external conductive bumps that are electrically connected between the first and second bodies.

In accordance with another aspect of the foregoing embodiment, the first body includes a first die and a cap fixed to said first die for hermetically closing said sensitive element, said cap having first through connections; and wherein said means of electrical connection include first internal conductive bumps electrically connecting said first through connections and said second body, and second internal conductive bumps electrically connecting said second body and said external conductive bumps.

In accordance with another aspect of the foregoing embodiment, a surface of the cap facing said supporting element has a first conductive region; and wherein said first internal conductive bumps are in contact with and arranged between said first through connections and said second body, and said second internal conductive bumps in contact with and arranged between said first conductive region and said second body; said external conductive bumps in contact with and arranged between said first conductive region and said supporting element.

In accordance with another aspect of the foregoing embodiment, the apparatus further includes an intermediate substrate of semiconductor material provided with second through connections and having a first face facing said first and second bodies and a second face facing said supporting element, said first face having a second conductive region; a first group of said first internal conductive bumps in contact with and arranged between said first through connections and said second conductive region, and a second group of said first internal conductive bumps in contact with and arranged between said second body and said second conductive region; said second internal conductive bumps in contact with and arranged between said second body and said second through connections, and said external conductive bumps in contact with and arranged between said second through connections and said supporting element.

In accordance with another embodiment of the invention, a process for manufacturing a portable device is provided that includes forming a first body of semiconductor material integrating a sensor element configured to detect movements of said first body and to generate a signal correlated to said movements; forming a second body of semiconductor material integrating conditioning electronics; electrically connecting said first and second bodies together; and electrically connecting said first and second bodies to a supporting element, comprising connecting said first and second bodies to said supporting element without interposition of packaging. Ideally the electrically connecting the first and second bodies to a supporting element includes connecting external conductive bumps between the first and second bodies and the supporting element.

In accordance with another aspect of the foregoing embodiment, forming a first body includes providing a first die, providing a cap having first through connections, and fixing said cap to said first die for hermetically sealing said sensitive element; and wherein electrically connecting said first and second bodies to a supporting element further comprises electrically connecting first internal conductive bumps between said first through connections and said second body, and electrically connecting second internal conductive bumps between said second body and said external conductive bumps.

In accordance with another aspect of the foregoing embodiment, the process further includes providing an intermediate substrate of semiconductor material, forming second through connections through said intermediate substrate, and forming a second conductive region on a face of said intermediate substrate; and wherein electrically connecting first internal conductive bumps comprises soldering a first group of said first internal conductive bumps between said first through connections and said second conductive region, and soldering a second group of said first internal conductive bumps between said second body and said second conductive region; and wherein electrically connecting second internal conductive bumps comprises soldering said second internal conductive bumps between said second body and said second through connections, and connecting external conductive bumps comprises soldering said external conductive bumps between said second through connections and said supporting element.

In accordance with another embodiment of the invention, an electronic device is provided that includes an accelerometer device and a supporting element, the accelerometer device including a first body of semiconductor material integrating a sensor element, configured to detect movements of said first body and generating a signal correlated to said movements; a second body of semiconductor material integrating a conditioning electronics, said second body being electrically connected to said first body; and electrical connection means for the electrical connection of said first and second bodies to said supporting element without the interposition of a package.

In accordance with another embodiment of the invention, an enhanced proximity free-fall detection device without a package for use with a portable hard disk is provided. Ideally the device and the hard disk are micro-encapsulated. The device includes a printed circuit board electrically coupled to the portable hard disk; a free-fall detection module configured to generate a free-fall detection signal upon detection of a free-fall condition to cause the portable hard disk device to attain a protected condition; and an electrical connection system electrically coupling the free-fall detection module to the printed circuit board, the electrical connection system comprising at least one first conductive bump electrically coupling the module to a first body containing a circuit for conditioning the free-fall signal prior to reception by the portable hard disk, and at least one second conductive bump electrically coupling the first body to the printed circuit board.

In accordance with another embodiment of the invention, the device includes an intermediate conductive member coupling the first body to the at least one second bump. Ideally, the module includes a through-hole for electrical coupling of a free-fall detection sensor to the at least one first bump, and the at least one first bump physically attaches the module to the printed circuit board without a package.

In accordance with another embodiment of the invention, an enhanced proximity free-fall detection device without a package for use with a portable hard disk is provided, preferably in micro-encapsulated form. The device includes a printed circuit board electrically coupled to the portable hard disk; a free-fall detection module configured to generate a free-fall detection signal upon detection of a free-fall condition to cause the portable hard disk device to attain a protected condition; and an electrical connection system electrically coupling the free-fall detection module to the printed circuit board, the electrical connection system including at least one first bump electrically coupling the module to a first intermediate substrate, at least one second bump electrically coupling a first body containing a circuit for conditioning the free-fall detection signal from the module prior to reception by the portable hard disk to the intermediate substrate, and at least one third bump electrically coupling the intermediate substrate to the printed circuit board.

BRIEF DESCRIPTION OF THE SEVERAL VIEWS OF THE DRAWING(S)

For a better understanding of the present invention, there is now described a preferred embodiment thereof purely by way of non-limiting example and with reference to the attached drawings, wherein:

FIG. 1 shows a simplified block diagram of a MEMS accelerometer device of a known type;

FIG. 2 shows a block diagram of a portable apparatus incorporating an accelerometer device for the detection of a free-fall condition in accordance with the present invention;

DETAILED DESCRIPTION OF THE INVENTION

Figure 3:
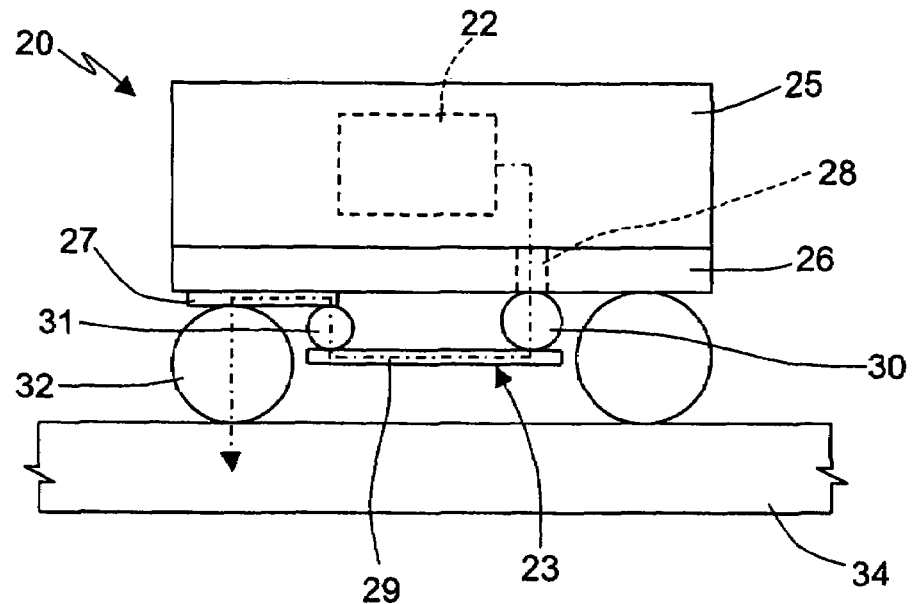
FIG. 3 shows schematically a side view of an accelerometer device according to a first embodiment of the present invention.

FIG. 2 is a schematic illustration of a portable apparatus 10 provided with a hard-disk unit (or hard-disk drive unit) 11, a control electronics 12, and one or more devices 13, which are specific for the portable apparatus 10. The control electronics 12 is connected to the hard-disk unit 11 and to the devices 13, and is configured to control the general operation of the portable apparatus 10.

The hard-disk unit 11 includes a data-storage medium 14, a read/write device 15, and a microprocessor circuit 16, configured to control operation of the hard-disk unit 11. The hard-disk unit 11 further includes an accelerometer device 20, connected to the microprocessor circuit 16 and mounted on a printed-circuit board (PCB) 34, which also carries the microprocessor circuit 16.

The accelerometer device 20 is of a linear type and has a MEMS device made using semiconductor technology, and has three axes of detection x, y and z, so as to generate three acceleration signals $A_x$, $A_y$, $A_z$, each correlated to the acceleration detected along a respective axis of detection (in a known way which is not described in detail.

In particular, according to an aspect of this embodiment of the invention, the accelerometer device 20 is without a package, so as to have a reduced thickness, thus compatible with the physical dimensions of the hard-disk unit 11, and so as to allow integration within the hard-disk unit 11.

In detail, and as illustrated schematically in FIG. 3, the accelerometer device 20 includes a sensor element 22, which generates an electrical signal as a function of the detected acceleration (typically a capacitive unbalancing signal), and a conditioning electronics 23, which receives the electrical signal and processes it appropriately (typically via operations of amplification and filtering; see also FIG. 1).

The sensor element 22 is integrated within a body of semiconductor material (generally silicon) formed by two portions, namely a first die 25 and a cap 26. The sensor element 22 is made using MEMS techniques and constitutes the sensitive part of the accelerometer device 20, generally comprising a fixed stator and a rotor, which is mobile with respect to the stator as a function of the detected acceleration, both the stator and the rotor being of a known type and so not illustrated in FIG. 3. For example, the sensor element 22 can be made as described in "3-axis digital output accelerometer for future automotive applications", B. Vigna et al., AMAA 2004.

The cap 26 hermetically closes the first die 25 and is attached to the latter via any bonding technique of a known type, for example via "glass-frit bonding" or "anodic bonding". The surface of the cap 26 not connected to the first die 25 carries first metallizations 27, and the cap 26 is equipped with first through connections 28, insulated from one another. The first through connections 28 can be made using any known technique, for example by means of metallized through holes (vias), or by means of the technique described in EP-A-1151962 and EP-A-1351288.

The conditioning electronics 23 is provided in a second die 29 of semiconductor material (typically silicon), which is distinct with respect to the sensor element 22.

The electrical connection between the sensor element 22 and the second die 29 is obtained using the "flip-chip" technique by means of first conductive bumps 30, set in electrical contact with, and arranged between, the first through connections 28 and electrical contacts provided on the surface of the second die 29. Second conductive bumps 31 connect together and are arranged between further electrical contacts provided on the surface of the second die 29 and the first metallizations 27. The first metallizations 27 are in turn connected to the printed-circuit board 34 via third conductive bumps 32. The third conductive bumps 32 have a diameter greater than the first and second conductive bumps 30 and 31, and are made using BGA (Ball Grid Array) techniques. In particular, the third conductive bumps 32 connect together and are arranged between the first metallizations 27 and corresponding electrical contacts formed on the surface of the printed-circuit board 34.

Illustrated with a dashed and dotted line in FIG. 3 is a possible path of the electrical signals transferred from the sensitive element 22 to the conditioning electronics 23, through the first through connections 28 and the first conductive bumps 30, and from the conditioning electronics 23 to the printed-circuit board 34, through the second conductive bumps 31, the first metallizations 27 and the third conductive bumps 32.

In detail, the diameter of the third conductive bumps is greater than the sum of the thickness of the second die 29 and the diameter of the first conductive bumps 30, so that the second die 29 remains arranged between the cap 26 and the printed-circuit board 34. The diameter of the third conductive bumps 32 is preferably greater than the sum indicated above so as to enable compensation of the thermal stresses caused by the different coefficient of thermal expansion of the semiconductor material of the cap 26 and of the material constituting the printed-circuit board 34 (generally vitreous or plastic material). The first and the second conductive bumps 30, 31 may, instead, be of a smaller size in so far as they electrically connect two materials having approximately the same coefficient of thermal expansion.

It should be noted that, for reasons of convenience of illustration, just one first through connection 28, just one first conductive bump 30 and second conductive bump 31, and just one first metallization 27 are shown in FIG. 3. Furthermore, only some of the conductive bumps illustrated carry electrical signals, whilst others have only structural functions of connection. It will in any case appear obvious to a person skilled in the art that the number of first through connections 28, of first, second and third conductive bumps 30, 31, 32, and of first metallizations 27, as well as their arrangement, can vary according to the number and the type of signals that are to be exchanged between the sensor element 22, the conditioning electronics 23, and the printed-circuit board 34.

Figure 4:
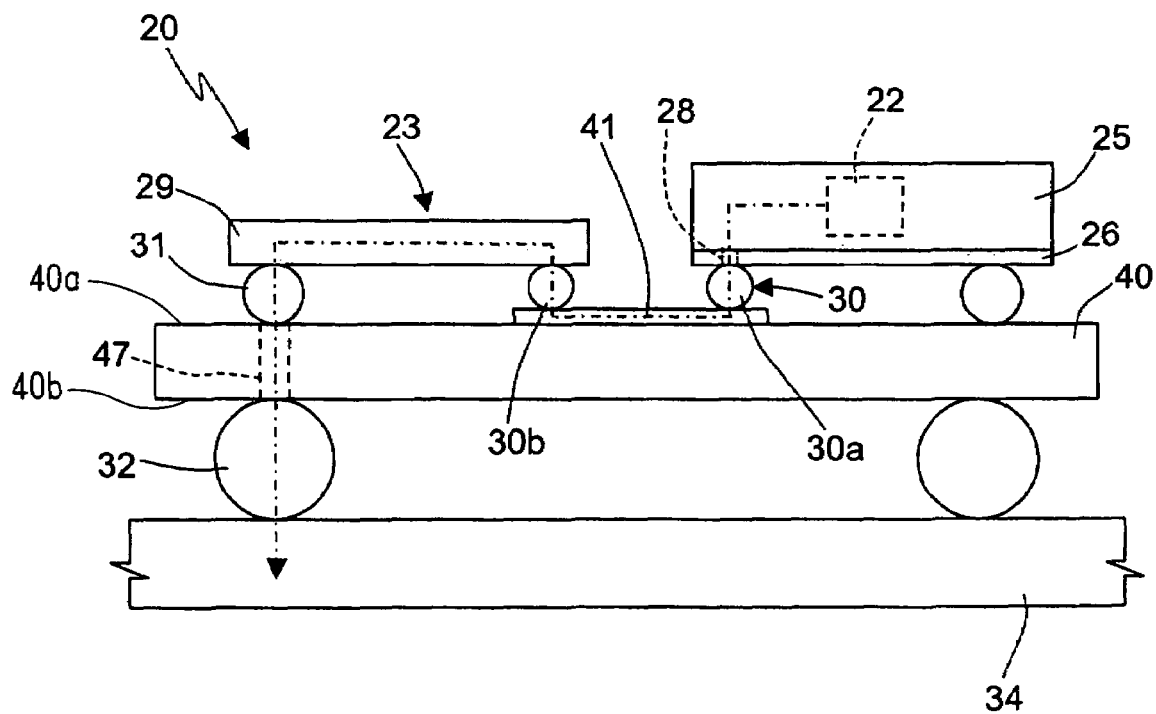
FIG. 4 shows schematically a side view of a second embodiment of the accelerometer device according to the present invention.

A second embodiment of the accelerometer device 20 is illustrated in FIG. 4, in which parts that are similar are identified with the same reference numbers used in FIG. 3 and are not described again.

In this second embodiment, both the second die 29 and the sensor element 22 are connected to an intermediate substrate 40 of semiconductor material (generally silicon). In detail, the intermediate substrate 40 has a first face facing the second die 29 and the sensor element 22, and a second face 40b facing the printed-circuit board 34. Second metallizations 41 are formed on the first face 40a, and second through connections 47, which are insulated from one another, are formed through the intermediate substrate 40.

In this second embodiment, a first group of first conductive bumps 30, designated by the reference number 30a, connects together and is arranged between the first through connections 28 made through the cap 26 and the second metallizations 41, whilst a second group of first conductive bumps 30, designated by the reference number 30b, connects together and is arranged between the second die 29 and the second metallizations 41. The second conductive bumps 31 connect together and are arranged between the second die 29 and the second through connections 47. Finally, the third conductive bumps 32 connect together and are arranged between the second through connections 47, on the opposite side with respect to the second conductive bumps 31, and the printed-circuit board 34. The diameter of the third conductive bumps 32 is once again greater than that of the first and second conductive bumps 30, 31 for reasons of compensation of the thermal stresses.

Also in FIG. 4, a possible path of the electrical signals exchanged between the sensitive element 22 and the conditioning electronics 23, and from this to the printed-circuit board 34, is indicated with a dashed and dotted line.

Furthermore, once again the number of first and second through connections 28, 47, of first, second and third conductive bumps 30, 31, 32 and of second metallizations 41, as well as their arrangement, can vary with respect to what is illustrated in FIG. 4, according to the number and the type of signals that must be exchanged between the sensitive element 22, the conditioning electronics 23, and the printed-circuit board 34.

Even though this second embodiment provides a thickness greater than the first embodiment illustrated in FIG. 3, it has the advantage of having a greater simplicity of implementation. Also in this second embodiment, the accelerometer device 20 is not provided with a package so that it has small dimensions (in particular as regards thickness), and can thus be integrated within the hard-disk unit 11.

In particular, both the embodiments described enable a thickness of the accelerometer device 20 of less than 0.7 mm to be obtained, and hence it is approximately half the thickness of accelerometer devices of a traditional type.

The advantages of the described portable apparatus are clear from the foregoing description.

It is in any case emphasized that the reduced thickness of the accelerometer device, and its consequent integration within the hard disk, enables a greater rapidity of response to be obtained following upon the determination of free fall, so as to prevent damage to the portable apparatus and in particular to the hard disk.

Furthermore, calibration operations of the sensitive element and of the conditioning electronics of the accelerometer device are facilitated. In fact, the calibration is normally carried out when the conditioning electronics and the sensitive element are encapsulated within a package, such a package using a molding resin, which renders said operation problematical. In this case, instead, the aforesaid parts of the accelerometer device are directly accessible, and it is thus possible to correct any operating faults more easily.

Finally, the absence of molding resin around the sensitive element sensibly reduces the thermomechanical stresses and the consequent thermal drifts of the electrical signals generated by the accelerometer device.

Finally, it is clear that modifications and variations can be made to the portable apparatus described herein, without thereby departing from the scope of the present invention, as defined in the annexed claims.

In particular, the detection of the free-fall condition may not be entrusted to the microprocessor of the hard-disk unit, but to the conditioning electronics of the accelerometer device. A solution of this sort enables even faster intervention times.

Other techniques of electrical connection can be used for the electrical connection between the sensitive element and the conditioning electronics, different from the ones illustrated and described. In particular, it is emphasized once again that the number of through connections, conductive bumps, and metallizations may vary according to the number and type of signals exchanged between the accelerometer device and the circuit of the hard disk.

Finally, even though the entire description regards the free-fall detection for the protection of a hard disk, it is clear that the accelerometer device can be used for other functions, for example for detecting a displacement imparted upon the portable apparatus for exiting from a condition of stand-by. In addition, the free-fall detection could be used for activating further actions of protection not linked to the protection of the hard disk but of other parts of the portable apparatus.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A portable apparatus having an accelerometer device and a supporting element, said accelerometer device comprising:
    a first body of semiconductor material integrating a sensor element configured to detect movements of said first body and generating a signal correlated to said movements;
    a second body of semiconductor material integrating conditioning electronics, said second body electrically connected to said first body; and
    electrical connection bumps for the electrical connection of said first and second bodies to said supporting element, said electrical connection bumps connecting said first and second bodies to said supporting element without the interposition of packaging to acheive an overall thickness of the device of less than 0.7 mm.

2. The portable apparatus of claim 1 wherein said electrical bumps connection comprise external conductive bumps electrically connected between said first and second bodies and said supporting element.

3. The portable apparatus of claim 2 wherein said first body comprises a first die and a cap fixed to said first die for hermetically closing said sensitive element, said cap having first through connections; and wherein said means of electrical connection comprise first internal conductive bumps electrically connecting said first through connections and said second body, and second internal conductive bumps electrically connecting said second body and said external conductive bumps.

4. The portable apparatus of claim 3 wherein said external conductive bumps are made using the BGA technique, and said first and second internal conductive bumps are made using the flip-chip technique.

5. The portable apparatus of claim 3 wherein a surface of said cap facing said supporting element has a first conductive region; and wherein said first internal conductive bumps are in contact with and arranged between said first through connections and said second body, and said second internal conductive bumps are in contact with and arranged between said first conductive region and said second body; said external conductive bumps in contact with and arranged between said first conductive region and said supporting element.

6. The portable apparatus of claim 5 wherein said second body has a first face facing said first body and carrying electrical contacts for connection with said first and second internal conductive bumps, and a second face facing said supporting element; said second body arranged between said first body and said supporting element; said external conductive bumps adapted to provide clearance for a thickness of the second die and the first conductive bump between the cap and the printed circuit board.

7. The portable apparatus of claim 3, further comprising an intermediate substrate of semiconductor material provided with second through connections and having a first face facing said first and second bodies and a second face facing said supporting element, said first face having a second conductive region; a first group of said first internal conductive bumps in contact with and arranged between said first through connections and said second conductive region, and a second group of said first internal conductive bumps in contact with and arranged between said second body and said second conductive region; said second internal conductive bumps in contact with and arranged between said second body and said second through connections, and said external conductive bumps in contact with and arranged between said second through connections and said supporting element.

8. The portable apparatus of claim 1 wherein said supporting element comprises a printed-circuit board.

9. The portable apparatus of claim 8, further comprising a data-storage device provided with a storage medium, a read/write device, and a control circuit for said read/write device; said accelerometer device and said control circuit carried by said printed-circuit board and integrated within said data-storage device.

10. The portable apparatus of claim 9 wherein said data-storage device comprises a hard-disk drive.

11. The portable apparatus of claim 9 wherein said control circuit receives at least one acceleration signal from said conditioning electronics for detecting a free-fall condition and activating actions of protection for said read/write device.

12. The portable apparatus of claim 9 wherein said conditioning electronics detect a free-fall condition, and said control circuit receives a signal of free-fall detection from said conditioning electronics for activating actions of protection for said read/write device.

13. The portable apparatus according of claim 1, chosen from the group comprising laptops, PDAs, digital audio players, cell-phones, and digital cameras.

14. A process for manufacturing a portable apparatus comprising:
    forming a first body of semiconductor material integrating a sensor element configured to detect movements of said first body and to generate a signal correlated to said movements;
    forming a second body of semiconductor material integrating conditioning electronics;
    electrically connecting said first and second bodies together; and
    electrically connecting said first and second bodies to a supporting element, comprising connecting said first and second bodies to said supporting element without interposition of packaging.

15. The process of claim 14 wherein electrically connecting said first and second bodies to a supporting element further comprises connecting external conductive bumps between said first and second bodies and said supporting element.

16. The process of claim 15 wherein forming a first body of semiconductor material comprises providing a first die, providing a cap having first through connections, and fixing said cap to said first die for hermetically sealing said sensitive element; and wherein electrically connecting said first and second bodies to a supporting element further comprises electrically connecting first internal conductive bumps between said first through connections and said second body, and electrically connecting second internal conductive bumps between said second body and said external conductive bumps.

17. The process of claim 16 wherein forming a first body of semiconductor material further comprises forming a first conductive region on a surface of said cap, and wherein electrically connecting first internal conductive bumps comprises soldering said first internal conductive bumps between said first through connections and said second body, and electrically connecting second internal conductive bumps comprises soldering said second internal conductive bumps between said second body and said first conductive region; and wherein connecting external conductive bumps comprises soldering said external conductive bumps between said first conductive region and said supporting element.

18. The process of claim 16, further comprising providing an intermediate substrate of semiconductor material, forming second through connections through said intermediate substrate, and forming a second conductive region on a face of said intermediate substrate; and wherein electrically connecting first internal conductive bumps comprises soldering a first group of said first internal conductive bumps between said first through connections and said second conductive region, and soldering a second group of said first internal conductive bumps between said second body and said second conductive region; and wherein electrically connecting second internal conductive bumps comprises soldering said second internal conductive bumps between said second body and said second through connections, and connecting external conductive bumps comprises soldering said external conductive bumps between said second through connections and said supporting element.

19. An electronic device comprising:
    an accelerometer device and a supporting element, said accelerometer device comprising:
    a first body of semiconductor material integrating a sensor element, configured to detect movements of said first body and generating a signal correlated to said movements;
    a second body of semiconductor material integrating a conditioning electronics, said second body being electrically connected to said first body; and
    electrical connection means for the electrical connection of said first and second bodies to said supporting element without the interposition of a package to achieve an overall thickness of the device of less than 0.7 mm.

20. The electronic device of claim 19 wherein said means of electrical connection comprise external conductive bumps electrically connected between said first and second bodies and said supporting element.

21. The electronic device of claim 20 wherein said first body comprises a first die and a cap fixed to said first die for hermetically closing said sensor element, said cap having first through connections; and wherein said means of electrical connection comprise first internal conductive bumps electrically connecting said first through connections and said second body, and second internal conductive bumps, electrically connecting said second body and said external conductive bumps.

22. The electronic device of claim 21 wherein said external conductive bumps are made using the BGA technique, and said first and second internal conductive bumps are made using the flip-chip technique.

23. The electronic device of claim 21 wherein a surface of said cap facing said supporting element has a first conductive region; and wherein said first internal conductive bumps are in contact with and arranged between said first through connections and said second body, and said second internal conductive bumps are in contact with and arranged between said first conductive region and said second body; said external conductive bumps being in contact with and arranged between said first conductive region and said supporting element.

24. The electronic device of claim 23 wherein said second body has a first face facing said first body and carrying electrical contacts for connection with said first and second internal conductive bumps, and a second face facing said supporting element; said second body arranged between said first body and said supporting element.

25. The electronic device of claim 21, further comprising an intermediate substrate of semiconductor material provided with second through connections and having a first face facing said first and second bodies and a second face facing said supporting element, said first face having a second conductive region; a first group of said first internal conductive bumps in contact with and arranged between said first through connections and said second conductive region, and a second group of said first internal conductive bumps in contact with and arranged between said second body and said second conductive region; said second internal conductive bumps in contact with and arranged between said second body and said second through connections, and said external conductive bumps in contact with and arranged between said second through connections and said supporting element.

26. The electronic device of claim 19 wherein said supporting element is a printed-circuit board.

27. The electronic device of claim 26, comprising a data-storage device and further comprising a storage medium, a read/write device, and a control circuit for said read/write device; said accelerometer device and said control circuit carried by said printed-circuit board.

28. The electronic device of claim 27 wherein said control circuit receives at least one acceleration signal from said conditioning electronics for detecting a free-fall condition and activating actions of protection for said read/write device.

29. The electronic device of claim 27 wherein said conditioning electronics detect a free-fall condition, and said control circuit receives a signal of free-fall detection from said conditioning electronics for activating actions of protection for said read/write device.

30. An enhanced proximity free-fall detection device without a package for use with a portable hard disk, comprising:
a printed circuit board electrically coupled to the portable hard disk;
a free-fall detection module configured to generate a free-fall detection signal upon detection of a free-fall condition to cause the portable hard disk device to attain a protected condition; and
an electrical connection system electrically coupling the free-fall detection module to the printed circuit board, the electrical connection system comprising at least one first conductive bump electrically coupling the module to a first body containing a circuit for conditioning the free-fall signal prior to reception by the portable hard disk, and at least one second conductive bump electrically coupling the first body to the printed circuit board without the interposition of packaging to achieve an overall thickness of the device of less than 0.7 mm.

31. The device of claim 30, further comprising an intermediate electrical conductive member coupling the first body to the at least one second bump.

32. The device of claim 30 wherein the free-fall detection module includes a through-hole for electrical coupling of a free-fall detection sensor in the free-fall detection module to the at least one first bump.

33. The device of claim 30 wherein the at least one first bump physically attaches the module to the printed circuit board and the at least one second bump physically attaches the first body to the module without a package.

34. An enhanced proximity free-fall detection device without a package for use with a portable hard disk, comprising:
a printed circuit board electrically coupled to the portable hard disk;
a free-fall detection module configured to generate a free-fall detection signal upon detection of a free-fall condition to cause the portable hard disk device to attain a protected condition; and
an electrical connection system electrically coupling the free-fall detection module to the printed circuit board, the electrical connection system comprising at least one first bump electrically coupling the module to a first intermediate substrate, at least one second bump electrically coupling a first body containing a circuit for conditioning the free-fall detection signal from the module prior to reception by the portable hard disk to the intermediate substrate without the interposition of packaging, and at least one third bump electrically coupling the intermediate substrate to the printed circuit board without the interposition of packaging to achieve an overall thickness of the device of less than 0.7 mm.

35. The device of claim 34 wherein the intermediate substrate comprises an intermediate conductive member electrically coupling the first body to the module.

36. The device of claim 34, further comprising a through-hole formed in the module for electrically coupling a free-fall detection sensor to the at least one first bump.

37. The device of claim 36, further comprising a through-hole formed in the intermediate layer for electrically coupling the module and the circuit on the first body to the printed circuit board.

38. The device of claim 37 wherein the at least one first bump physically attaches the module to the intermediate substrate, the at least one second bump physically attaches the first body to the intermediate substrate, and the at least one third bump physically attaches the intermediate substrate to the printed circuit board.

* * * * *

UNITED STATES PATENT AND TRADEMARK OFFICE
CERTIFICATE OF CORRECTION

PATENT NO. : 7,578,184 B2  Page 1 of 1
APPLICATION NO. : 11/302486
DATED : August 25, 2009
INVENTOR(S) : Luca Fontanella et al.

It is certified that error appears in the above-identified patent and that said Letters Patent is hereby corrected as shown below:

Column 8
Lines 31-32, "connecting said first and second bodies to said supporting element" should read as --connecting said first body to the second body without the interposition of packaging and connecting said first and second bodies to said supporting element--

Column 9
Lines 52-54, "connecting said first and second bodies to said supporting element without interposition of packaging." should read as --connecting said first body to the second body without the interposition of packaging and connecting the first and second bodies to said supporting element without interposition of packaging to achieve an overall thickness of the apparatus of less than 0.7mm.--

Column 10
Lines 43-44, "electrical connection means for the electrical connection of said first and second bodies to said" should read as --electrical connectors for the electrical connection of said first body to said second body without the interposition of packaging and connecting the first and second bodies to said--

Column 12
Line 3, "disk, and at least one second" should read as --disk without the interposition of packaging, and at least one second--

Line 30, "intermediate substrate, at least one second" should read as --intermediate substrate without the interposition of packaging, at least one second--

Signed and Sealed this

Fourth Day of May, 2010

David J. Kappos
*Director of the United States Patent and Trademark Office*